United States Patent
Eschelbeck et al.

(10) Patent No.: US 6,553,377 B1
(45) Date of Patent: Apr. 22, 2003

(54) SYSTEM AND PROCESS FOR MAINTAINING A PLURALITY OF REMOTE SECURITY APPLICATIONS USING A MODULAR FRAMEWORK IN A DISTRIBUTED COMPUTING ENVIRONMENT

(75) Inventors: Gerhard Eschelbeck, Santa Clara, CA (US); Thomas Steiner, Linz (AT); Mayr Johannes, Linz (AT)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 09/541,355

(22) Filed: Mar. 31, 2000

(51) Int. Cl.[7] ............................................... G06F 17/30
(52) U.S. Cl. ...................................... 707/10; 707/104.1
(58) Field of Search ............................... 707/1, 2, 9, 10, 707/104.1; 709/202, 223, 217

(56) References Cited

U.S. PATENT DOCUMENTS

| | | | | |
|---|---|---|---|---|
| 5,655,081 A | * | 8/1997 | Bonnell et al. | 709/202 |
| 5,872,931 A | * | 2/1999 | Chivaluri | 709/223 |
| 5,958,010 A | * | 9/1999 | Agarwal et al. | 709/224 |
| 6,332,163 B1 | * | 12/2001 | Bowman-Amuah | 709/231 |

OTHER PUBLICATIONS

M. Pietrek, "Learn System–Level Win32 Coding Techniques by Writing an API Spy Program," vol. 9, No. 12, Microsoft Systems Journal, Microsoft Press (Dec. 1994).

T. Fraser et al., "Hardening COTS Software with Generic Software Wrappers," Proc. of the 1999 IEEE Symp. on Security and Privacy, IEEE, Inc. (1999).

* cited by examiner

Primary Examiner—Diane D. Mizrahi
Assistant Examiner—Yicun Wu
(74) Attorney, Agent, or Firm—Patrick J. S. Inouye; Christopher J. Hamaty

(57) ABSTRACT

A system and a process for maintaining a plurality of remote security applications using a centralized broker in a distributed computing environment are described. A centralized broker is executed on a designated system within the distributed computing environment. A console interface from the centralized broker is exposed. The console interface implements a plurality of browser methods which each define a browser function which can be invoked by a plurality of snap-in components. A namespace snap-in component is defined and includes a logical grouping identifying at least one remote security application being executed on a remote system within the distributed computing environment. A namespace interface from the namespace snap-in component is exposed. The namespace interface implements a plurality of namespace methods each defining a storage function which can be invoked by the centralized broker. A repository including a plurality of storages corresponding to each remote system is formed. Each storage includes a set of attributes describing each such remote security application defined within the namespace snap-in component.

19 Claims, 11 Drawing Sheets

SYSTEM AND PROCESS FOR MAINTAINING A PLURALITY OF REMOTE SECURITY APPLICATIONS USING A MODULAR FRAMEWORK IN A DISTRIBUTED COMPUTING ENVIRONMENT

CROSS-REFERENCE TO RELATED APPLICATION

This patent application is related to commonly-assigned U.S. patent applications Ser. No. 09/540,973 entitled, "System And Process For Brokering A Plurality Of Security Applications Using A Modular Framework In A Distributed Computing Environment," filed Mar. 31, 2000, pending and Ser. No. 09/541,365 entitled "System And Process For Reporting Network Events With A Plurality Of Hierarchically-Structured Databases In A Distributed Computing Environment," filed Mar. 31, 2000, pending, the disclosures of which are incorporated herein by reference.

FIELD OF THE INVENTION

The present invention relates in general to security application management and, in particular, to a system and process for maintaining a plurality of remote security applications using a modular framework in a distributed computing environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Most current internetworks and intranetworks are based on the Transmission Control Protocol/Internet Protocol (TCP/IP) suite, such as described in W. R. Stevens, "TCP/IP Illustrated," Vol. 1, Ch. 1, Addison-Wesley (1994), the disclosure of which is incorporated herein by reference. Computer systems and network devices employing the TCP/IP suite implement a network protocol stack, which includes a hierarchically structured set of protocol layers. Each protocol layer performs a set of pre-defined functions as specified by the official TCP/IP standards set forth in applicable Requests for Comment (RFC).

The growth of distributed computing environments, especially TCP/IP environments, has created an increased need for computer security, particularly for protecting operating system and application software and stored data. A wide range of security applications are needed to ensure effective security. For example, firewalls and intrusion detection systems are necessary to combat would-be network intruders, the so-called "hackers," of the networking world. Similarly, antivirus scanning applications must be regularly executed and, equally importantly, updated, to detect and eradicate "malware" consisting of computer viruses, Trojan horses, and other forms of unauthorized content.

In addition to these forms of reactive security applications, proactive security applications are increasingly being adopted to prevent security breaches from happening. For instance, vulnerability scanners probe and identify potential security risks and concerns. Likewise, "honey pot" or decoy host systems create the illusion of a network of relatively unguarded, virtual hosts within which a would-be hacker can be tracked and identified.

While these types of security applications form a powerful arsenal of defensive and offensive security tools, installing, configuring and maintaining security applications, particularly when installed on remote client systems, can be a time-consuming and complex task. Generic solutions to managing security applications generally fail due to variations in installed hardware, operating system type and patch level, and application sets and version levels for each client system. Consequently, each client system must first be evaluated before any changes are effected, a task which only adds more time to an already tedious process. Client management applications can assist with maintaining an up-to-date inventory of the environment installed on each client, but these applications take a relatively passive role and lack the capability to effectively manage problem-specific vertical applications, such as security applications.

In addition, a computing site will often implement security policies to maximize the effectiveness of the security applications in place. For example, a security policy might require that individual client passwords be changed every month. However, even within a given site, security policies may vary and require different settings depending upon the platform and organizational needs. As well, individual systems, particularly when left with open administrative permissions, can depart from the actual security policies in effect, thereby by-passing the security measures and potentially creating a network vulnerability. Furthermore, security policies represent a meta level of security which is not necessarily dependent upon any one particular security application. Thus, implementing and enforcing security policies adds another layer of complexity to security application management.

Finally, the time required to properly configure and maintain a network site grows substantially with each installed platform and often several systems or even the entire network site can require maintenance to address specific problems or changes in security policies. For instance, a computer virus detection signature must be installed on each client system for every newly-discovered computer virus. Installing these virus signatures can take a significant amount of time. Similarly, software updates cannot be installed on any given system until a complete inventory of hardware, operating system, security applications, and patch levels has been completed. Obtaining an inventory can be particularly difficult in an environment that includes mobile computing resources.

Therefore, there is a need for an approach to securely managing security applications running on client systems, and particularly remote client systems, from a centralized management console. Such an approach would preferably provide the capability to install, configure, maintain, and update security applications and policies on the client systems and to receive events returned therefrom.

There is a further need for an approach to automatically updating security applications running on multiple client systems from a centralized management console.

SUMMARY OF THE INVENTION

The present invention provides a system and process for configuring and managing security applications executing on remote client systems in a distributed computing environment. A security management interface service interfaces to one or more snap-in components, including a namespace and an agent communication services snap-in components. The namespace snap-in component interfaces to a repository within which is stored one or more console storage objects. Each console storage object can contain one or more potentially nested storages which each contain one or more sets of attributes. Each attributes set corresponds to a remote security application. The remote security applications on each remote client system are interfaced to an agent which communicates with the security management interface service via the agent communication services snap-in component. The security management interface service processes service request received from the snap-in components via the namespace and agent communication services snap-in components.

An embodiment of the present invention is a system and a process for maintaining a plurality of remote security applications using a centralized broker in a distributed computing environment. A centralized broker is executed on a designated system within the distributed computing environment. A console interface from the centralized broker is exposed. The console interface implements a plurality of browser methods which each define a browser function which can be invoked by a plurality of snap-in components. A namespace snap-in component is defined and includes a logical grouping identifying at least one remote security application being executed on a remote system within the distributed computing environment. A namespace interface from the namespace snap-in component is exposed. The namespace interface implements a plurality of namespace methods each defining a storage function which can be invoked by the centralized broker. A repository including a plurality of storages corresponding to each remote system is formed. Each storage includes a set of attributes describing each such remote security application defined within the namespace snap-in component.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
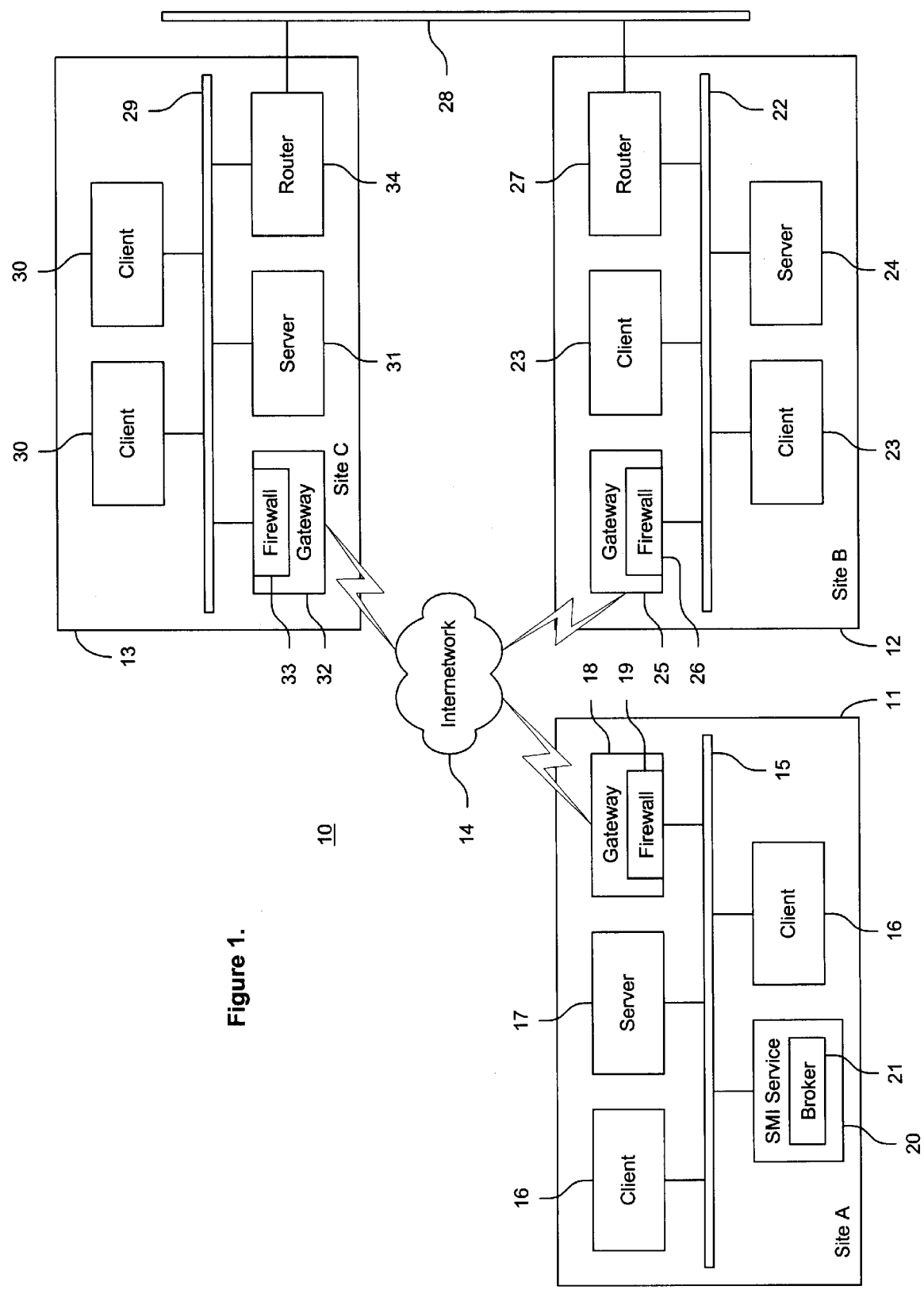
FIG. 1 is a functional block diagram showing a system for maintaining a plurality of remote security applications using a modular framework in a distributed computing environment in accordance with the present invention.

FIG. 1 is a functional block diagram showing a system 10 for maintaining a plurality of remote security applications using a modular framework in a distributed computing environment in accordance with the present invention. A plurality of networked computing sites, including Site "A" 11, Site "B" 12 and Site "C" 13, are interconnected via an internetwork 14, such as the Internet. Each site 11, 12, 13, includes an intranetwork 15, 22, 29, respectively, over which a plurality of networked resources are interconnected. For instance, Site "A" 11 includes a plurality of client systems 16 and a network server system 17. Individual security applications (not shown) are executed on the client systems 16 and network server system 17. The intranetwork 15 is interconnected to the internetwork 14 through a gateway 18 which includes a firewall ("FW") 19.

In addition, Site "A" 11 includes a security management interface ("SMI") service 20 upon which a centralized broker 21 is executed, as further described below with reference to FIG. 2. The security management interface service 20 provides the infrastructure necessary for brokering security applications running on a plurality of clients, integrating snap-in components, accessing a namespace, embedding user interface elements, and handling window messages. The security management interface service 20 could also be run concurrently on several systems for redundancy and load sharing. One centralized broker 21 would be designated as a master centralized broker which would synchronize configuration and database information to backup security management interface services. If the master security management interface service became unavailable, the backup security management interface services would take over managing the security applications. A system and method for interfacing and brokering security applications using a security management interface framework is described in the related, commonly-assigned U.S. patent application, entitled "System And Process For Brokering A Plurality Of Security Applications Using A Modular Framework In A Distributed Computing Environment," filed Mar. 31, 2000, pending, the disclosure of which is incorporated herein by reference.

Similarly, Site "B" 12 includes a plurality of client systems 23, a network server system 24, and a gateway 25 with a firewall 26 and Site "C" 13 likewise includes a plurality of clients 30, a network server system 31, and a gateway 32 with a firewall 33. In addition, Site "B" 12 and Site "C" 13 are further interconnected via a dedicated high-speed network link 28 which is interfaced to intranetwork 22 and intranetwork 29 via routers 27 and 34, respectively. Other network topologies and configurations of networks, subnetworks and computational resources are feasible, including various combinations of networking hardware, such as routers, hubs, bridges, gateways and similar devices.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the intranetworks 11, 12, 13 and internetwork 14 implement a Transmission Control Protocol/Internet Protocol (TCP/IP) network stack protocol implementation.

In the described embodiment, a security management interface service 20 suitable for use with the present invention is the Security Management Interface included as part of the CyberCop Monitor network security application, licensed by Network Associates, Inc., Santa Clara, Calif. The Security Management Interface framework includes a single console window from which heterogeneous security applications executed on both local and remote systems can be managed. The console also includes the ability to connect to remote systems via agents, monitor security application activity, change settings, generate reports, and control user access. In addition, through the use of a namespace repository, the Security Management Interface framework can be used to install and configure security applications on both local and remote systems from a centralized system. As well, security results can be collected into event databases on remote systems and retrieved into a central event database for analysis and reporting.

Figure 2:
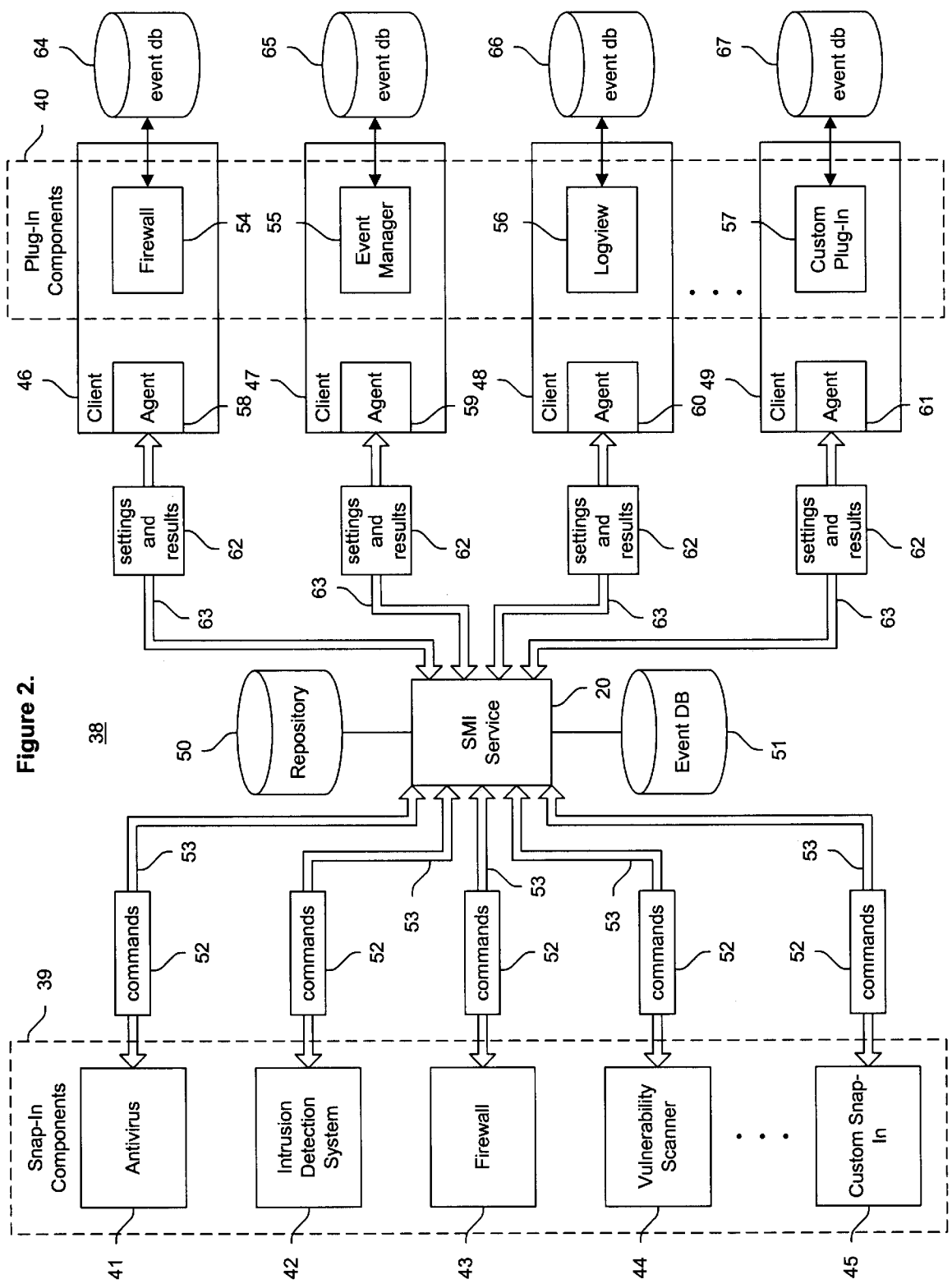
FIG. 2 is a process diagram showing the flow of information through the system of FIG. 1.

FIG. 2 is a process diagram 38 showing the flow of information through the system 10 of FIG. 1. Generally, the security management interface service 20 provides a basic user interface. Commands 52 flow from a set of snap-in components 39 to a set of plug-in components 40 running on clients via the security management interface service 20. In turn, the plug-in components 40 return settings and results 62 also via the security management interface service 20. The plug-in components 40 specialize in providing specific services, which, by way of example, can include an antivirus scanner 41, intrusion detection system 42, firewall 43, vulnerability scanner 44, or a custom security application snap-in component 45. The plug-in components 40 control local security applications and configure data on behalf of their corresponding snap-in component 39. By way of example, the plug-in components 40 can include a firewall 54, event manager 55, log viewer 56, or a custom security application plug-in component 57.

Information flows through the system 10 in accordance with pre-defined programmatic interfaces. The security management interface service 20 and each of the snap-in components 39 expose application programming interfaces (APIs) 53 through which are implemented browser and user interface methods, respectively. The security management interface service 20 interfaces to local and remote clients 46, 47, 48, 49 using an authenticated connection 63 over which are exchanged encrypted packets 62. Each client 46, 47, 48, 49 implements an agent 58, 59, 60, 61, respectively, which provides a communication component for a corresponding plug-in component 40.

A special snap-in component 39, known as a namespace (shown below in FIG. 4), works in conjunction with repository 50 to manage remote security applications executing on the individual clients 46, 47, 48, 49. The namespace and repository 50 enable the security applications to be remotely configured and managed from the centralized broker 21 (shown in FIG. 1) running on the security management interface service 20. The namespace and repository 50 are further described below with reference to FIG. 4.

In a further embodiment of the described invention, individual clients 46, 47, 48, 49 can store network event data into local event databases 64, 65, 66, 67, respectively. The individual event databases 64, 65, 66, 67 can be hierarchically structured and network event data cascaded upwards into successive levels for eventual logging into a root event database 51 associated with the security management interface service 20. A system and method for providing a hierarchically-structured event database in a security application management framework is described in the related, commonly-assigned U.S. patent application, entitled "System And Process For Reporting Network Events With A Plurality Of Hierarchically-Structured Databases In A Distributed Computing Environment," filed Mar. 31, 2000, pending, the disclosure of which is incorporated herein by reference.

Figure 3:
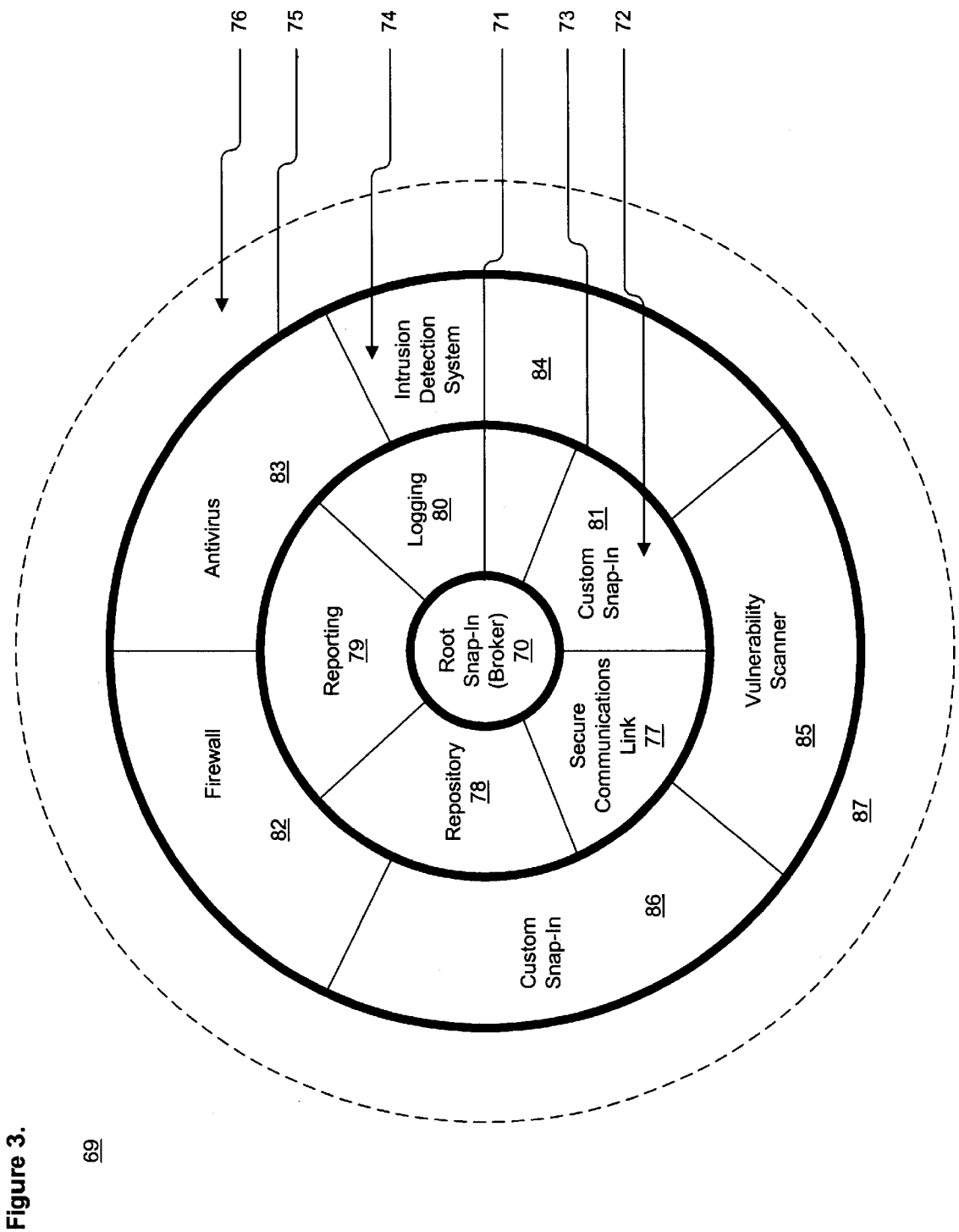
FIG. 3 is a relationship diagram showing the logical layering of the snap-in components of the system of FIG. 1.

FIG. 3 is a relationship diagram 69 showing the logical layering of the snap-in components of the system 10 of FIG. 1. The snap-in components are structured in successive, hierarchical layers 70, 72, 74, 76 with an application programming interface (API) 71, 73, 75 logically separating each layer. The hierarchy is rooted in the security management interface service 20 (shown in FIG. 1) through a root snap-in component 70. This component provides rudimentary user interface functionality via a console window and interfaces to a set of top level snap-in components 72 via a pair of APIs 71. The root snap-in component 70 exposes a console interface implementing a set of browser methods. The top level snap-in components 72 provide security application-independent functionality, such as, secure communications link 77, repository 78, reporting 79, logging 80, and custom top level snap-in component 81. The top-level snap-in components 72 expose a set of snap-in interfaces implementing a set of service methods.

The root snap-in component 70 and top level snap-in components 72 define the basic infrastructure of the security management interface framework. Individual security applications can be grafted onto the basic infrastructure in a similar, layered fashion. Individual security applications interface to the basic infrastructure as security application snap-in components 74. These components configure and control remote security applications (not shown) and include, for example firewall 82, antivirus scanner 83, intrusion detection system 84, vulnerability scanner 85, and custom security application snap-in component 86. Generally, each security application snap-in component 74 represents only the first layer of a configuration snap-in component tree. Consequently, as needed, the security application snap-in components 74 interface to a set of custom security application snap-in components 76. These components support the security application snap-in components 74 by providing, for example, separate configuration dialogues, and are managed by their respective security application snap-in component 76. Other forms of snap-in component layering are feasible.

Figure 4:
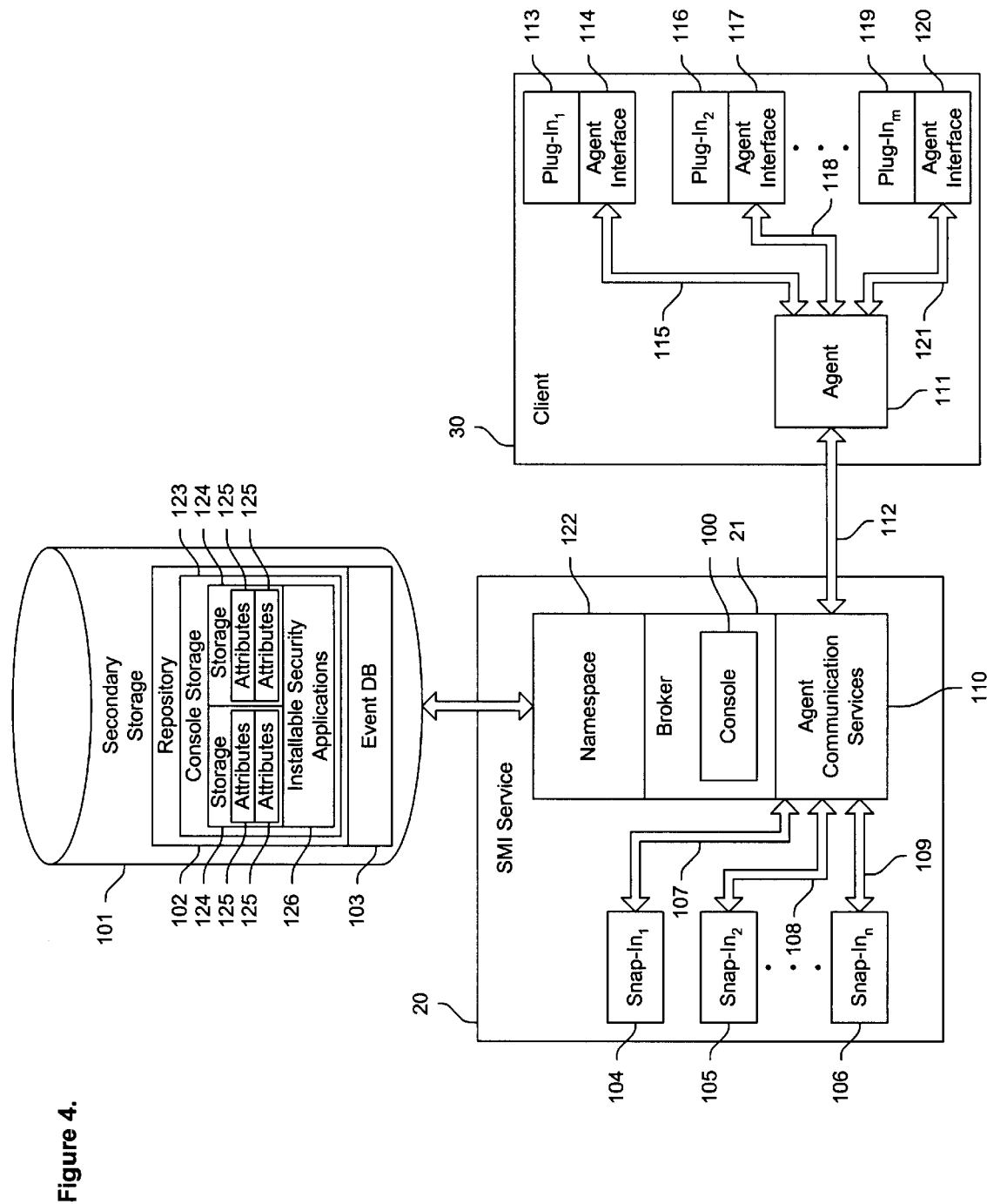
FIG. 4 is a block diagram showing the functional software modules of the system of FIG. 1.

FIG. 4 is a block diagram showing the functional software modules of the system 10 of FIG. 1. Each software module is a computer program written as source code in a conventional programming language, such as the C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

On the server side, the security management interface service 20 consists of five sets of components: snap-in components 104, 105, 106; centralized broker 21; secondary storage 101; agent communication service snap-in 110; and namespace 122. On the client side, there are two sets of components: plug-in components 113, 116, 119; and an agent 111. Snap-in components 104, 105, 106 and plug-in components 113, 116, 119 are described above with reference to FIG. 3.

The centralized broker 21 provides basic management functionality, including exporting a rudimentary user interface via a console window 100 for updating, accessing help functions, and providing proxy services. The snap-in components 104, 105, 106 can asynchronously notify the centralized broker 21 of network events through the console interface, described above with reference to FIG. 3. The secondary storage 101 is used by the security management interface service 20 to store configuration information. In addition, in a further embodiment of the described invention, the secondary storage 101 includes an event database 103 for storing network event data received from remote clients.

The namespace 122 is a specialized snap-in component for enabling the installation, configuration and management of remote security applications. The namespace 122 provides a federated naming scheme for uniquely identifying security applications operating within the context of the security management interface service 20. The namespace 122 creates logical groupings identifying the remote security applications according to their respective client systems and maintains a description of each security application and operating environment within repository 102 as console storage objects 123.

Repository 102 is a structured storage maintained by the namespace 122 within the secondary storage 101. Each console storage object 123 can contain one or more storages 124, each of which can potentially contain nested storages. Each storage 124 is analogous to a directory and can contain one or more sets of attributes 125. Each attributes set 125 is analogous to a file and stores properties and settings for individual remote security applications. One attributes set 125 corresponds to a plug-in component 113 and are grouped within a storage 124 according to client system 30. In addition, sets of installable security applications 126 are maintained within console storage objects 123 and can be used to install a new or updated security application or related component as a plug-in component 40 on a client system 30.

The agent communication service snap-in 110 on the server side works in conjunction with a corresponding agent 111 on the client side for enabling a security application snap-in component 104, 105, 106 to remotely configure and manage an associated plug-in component 113, 116, 119. Each plug-in component 113, 116, 119 must include an agent interface 114, 117, 120 which communicates to the agent 111 though an agent interface 115, 118, 121. In the described embodiment, the agent communication service 110 and agent 111 communicate via an authenticated channel 112 using a proprietary, encrypted packet format, known as an INetPacket. The security management interface service 20 operates in accordance with a sequence of process steps, as further described below beginning with reference to FIG. 6.

Figure 5:
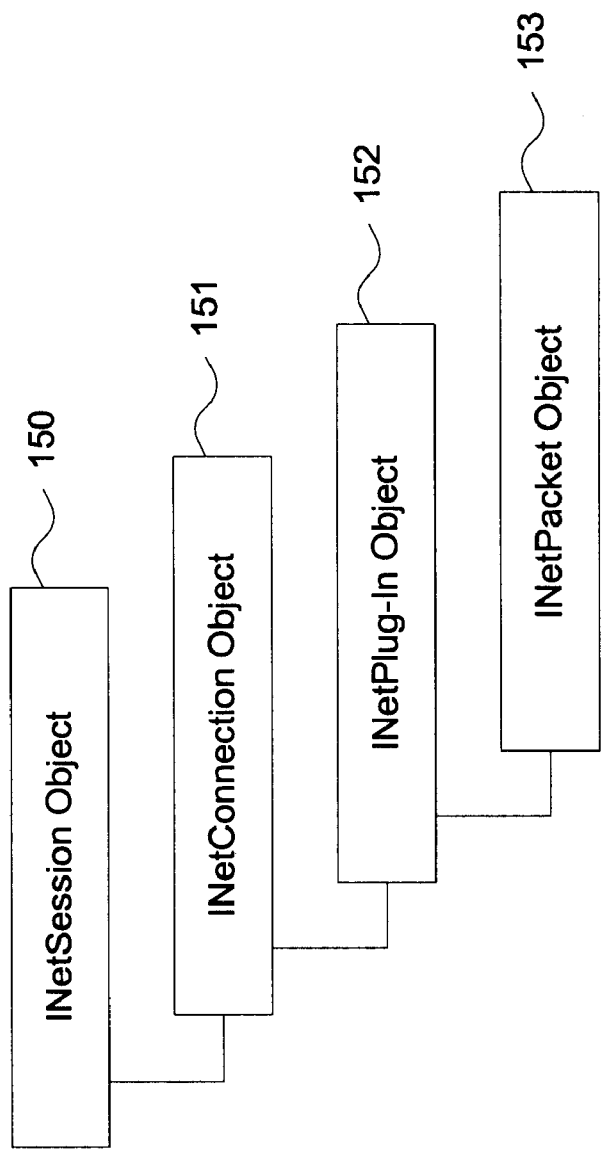
FIG. 5 is an object model diagram of the communication architecture used in the system FIG. 1.

FIG. 5 is an object model diagram of the communication architecture used in the system 10 of FIG. 1. The security management interface service 20 communication architecture is based on an object-oriented model consisting of four successively instantiated objects: INetSession object 150, INetConnection object 151, INetPlug-In object 152, and INetPacket object 153. Thus, communication between snap-in components 39 and plug-in components 40 is structured in a layered fashion, consisting of a session, connection, and plug-in component. A session, as transacted using the methods implemented by the interface of the INetSession object 151, provides rudimentary information, such as authentication and encryption methods. A connection, as transacted using the methods implemented by the interface of the INetConnection object 151, provides agent-related data and enables snap-in components 39 to instantiate plug-in objects 152 which are used for actual data transmission. Thus, all data necessary for communication between a snap-in component 39 and a corresponding plug-in component 40 is entirely embedded within the INetSession (session), INetConnection (connection), and INetPlug-In (plug-in) objects, thereby hiding network protocol and data transfer mechanisms from the remote client system 30. In the described embodiment, Distributed Common Object Model (DCOM), Web Based Enterprise Management (WBEM), and Socket-based connections are supported, although other forms of connectivity are feasible.

The INetSession object 150 provides the foundation for communication between snap-in components 39 and plug-in components 40. Each INetSession object 150 establishes and maintains new communication links to remote clients responsive to a communication request from a snap-in component 39, including the namespace 122 (shown in FIG. 4). The methods implemented in the interface of the INetSession object 150 are further described below with reference to FIG. 8. A net session is a form of transmission channel which, in the described embodiment, is an authenticated connection. Child objects inheriting from INetSession objects 150, including INetConnection objects 151, each create a reference to their parent INetSession object 150. Thus, each INetSession object 150 will be destroyed only after all child objects have been released by their owner processes. Session establishment can fail if the specified client system 30 is not reachable over the network or no agent 111 (shown in FIG. 4) is installed on the destination client system 30.

The INetConnection object 151 provides data transfer in a plug-in component independent manner. Each INetConnection object 151 initiates communication between a snap-in component 39 and a remote client 30 utilizing the underlying session object once the INetConnection interface has been queried. The methods implemented in the interface of the INetSession object 150 are further described below with reference to FIG. 9. These methods include, for instance, installed security application enumeration and status information retrieval. INetConnection objects 151 must create a reference to their parent INetSession object 150 to ensure that the communication link remains open until the last connection closes.

The INetPlug-In object 152 provides mechanisms for communicating directly with remotely installed plug-in components 40 utilizing the underlying session and connection objects. The methods implemented in the interface of the INetPlug-In object 152 are further described below with reference to FIG. 10. Commands and properties sent from snap-in components 39 to their corresponding plug-in component 40 can be initiated without further destination information. Each INetPlug-In object 152 also provides synchronous write access to plug-in components 40 to avoid conflicts between competing snap-in components 39. INetPlug-In objects 152 must create a reference to their parent object to ensure the communication link remains open until the last connection closes.

The methods implemented in the interface of the INet-Packet object 153 are further described below with reference to FIG. 11. These methods include, for instance, synchronization between snap-in components 39 and plug-in components 40. Internally, each INetPacket object 153 incorporates a heterogeneous data structure containing atomic data elements.

Figure 6:
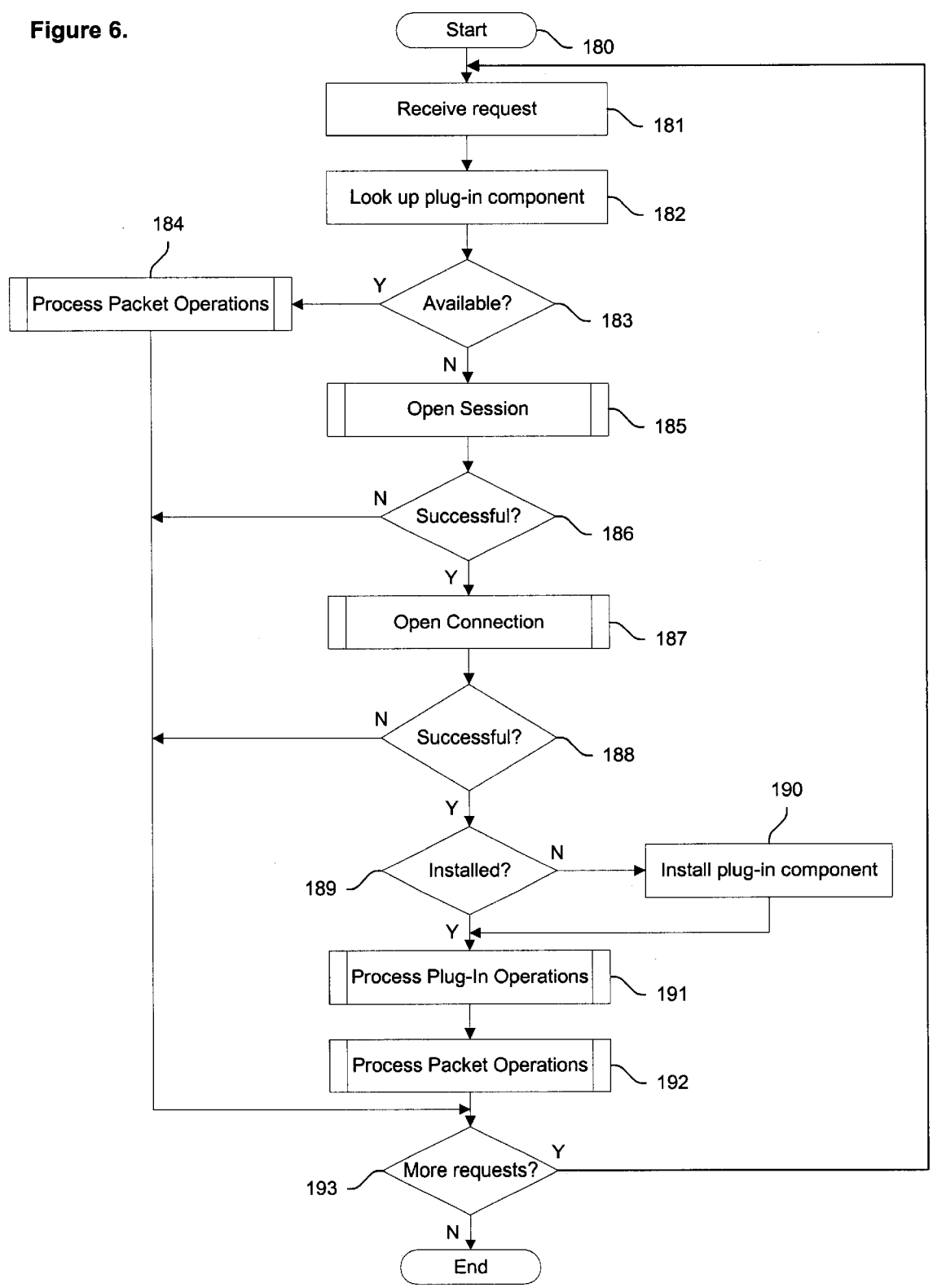
FIG. 6 is a flow diagram showing a process for maintaining a plurality of remote security applications using a modular framework in a distributed computing environment in accordance with the present invention.

FIG. 6 is a flow diagram showing a process for maintaining a plurality of remote security applications 180 using a modular framework in a distributed computing environment in accordance with the present invention. Briefly, the process attempts to process a service request received from a snap-in component 39 and establishes a session, connection, and plug-in, as necessary.

First, a request for performing a service, such as modifying a security application attribute on a remote security application, is received from a snap-in component (block 181) interfaced to the security management interface service 20. The namespace 122 (shown in FIG. 4) attempts to find the requested plug-in component by referencing the repository 102. If the plug-in component 40 is available (block 183), the request is processed as a set of packet operations (block 184), as further described below with reference to FIG. 10. Otherwise, if the plug-in component 40 is not available (block 183), a session is opened (block 185), as further described below with reference to FIG. 7. If the session is not successfully opened (block 186), the request fails. Otherwise, a connection is opened (block 187), as further described below with reference to FIG. 9. If the connection is not successfully opened (block 188), the request fails. Otherwise, the namespace 122 determines whether the requested plug-in component 40 is installed on the remote client system 30 (block 189). If not installed, the namespace 122 installs the requested plug-in component 40 (block 190). Otherwise, the plug-in component is instantiated as a plug-in object, INetPlug-In object 152 (shown in FIG. 5). The request is then processed as a set of packet operations (block 192), as further described below with reference to FIG. 10. Request processing continues until there are no further requests (block 193), after which the process terminates.

Figure 7:
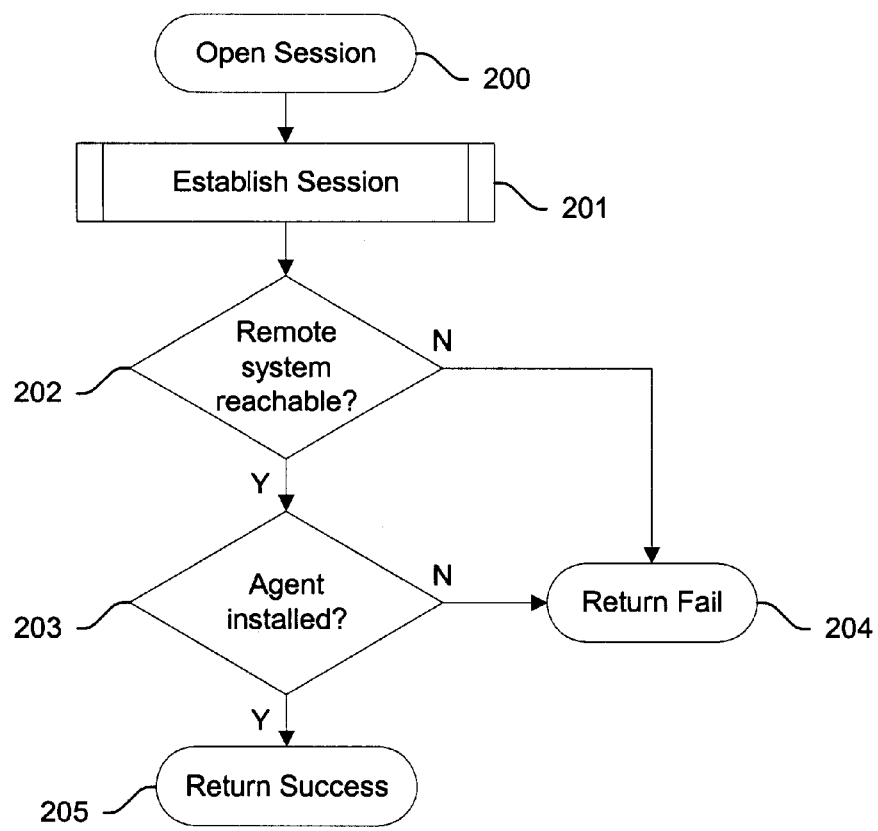
FIG. 7 is a flow diagram showing the routine for opening a session for use in the process of FIG. 6.

FIG. 7 is a flow diagram showing the routine for opening a session 200 for use in the process of FIG. 6. The purpose of this routine is to attempt to open a session. First, a session is attempted to be established (block 201), as further described below with reference to FIG. 8. If the remote client system 30 is not reachable (block 202), the routine returns a flag indicating failure (block 204). Similarly, if the remote client system 30 does not have an agent 111 installed (block 203), the routine likewise returns a flag indicating failure (block 204). Otherwise, the session was successfully opened and the routine returns a flag indicating success (block 205).

Figure 8:
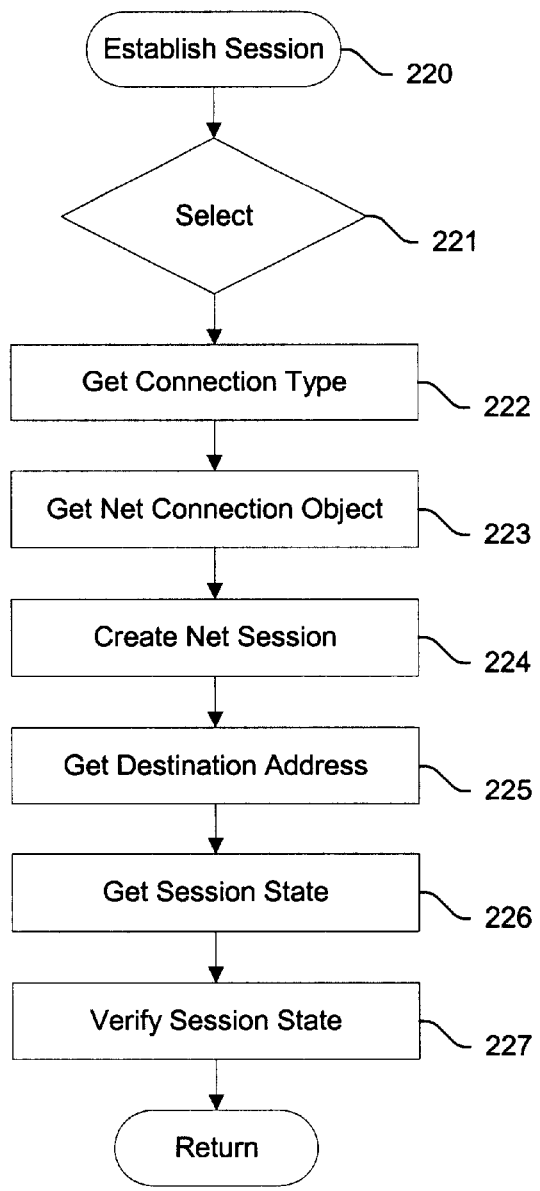
FIG. 8 is a flow diagram showing the routine for establishing a session for use in the routine of FIG. 7.

FIG. 8 is a flow diagram showing the routine for establishing a session 220 for use in the routine of FIG. 7. The purpose of this routine is to process a call on a method implemented in the session interface, INetSession, of the security management interface service 20. The appropriate method is selected (block 221) and executed to perform an operation as follows. GetConnectionType (block 222) retrieves the currently active transport mechanism for the session. CreateNetConnectionObject (block 223) creates a new connection object belonging to the session. CreateNetSession (block 224) establishes a new session to an agent system. GetDestinationAddress (block 225) returns the name of a remote computer. GetSessionState (block 226) determines the current connection state of the network session. VerifySessionState (block 227) checks and resets the current connection state of the network session.

Figure 9:
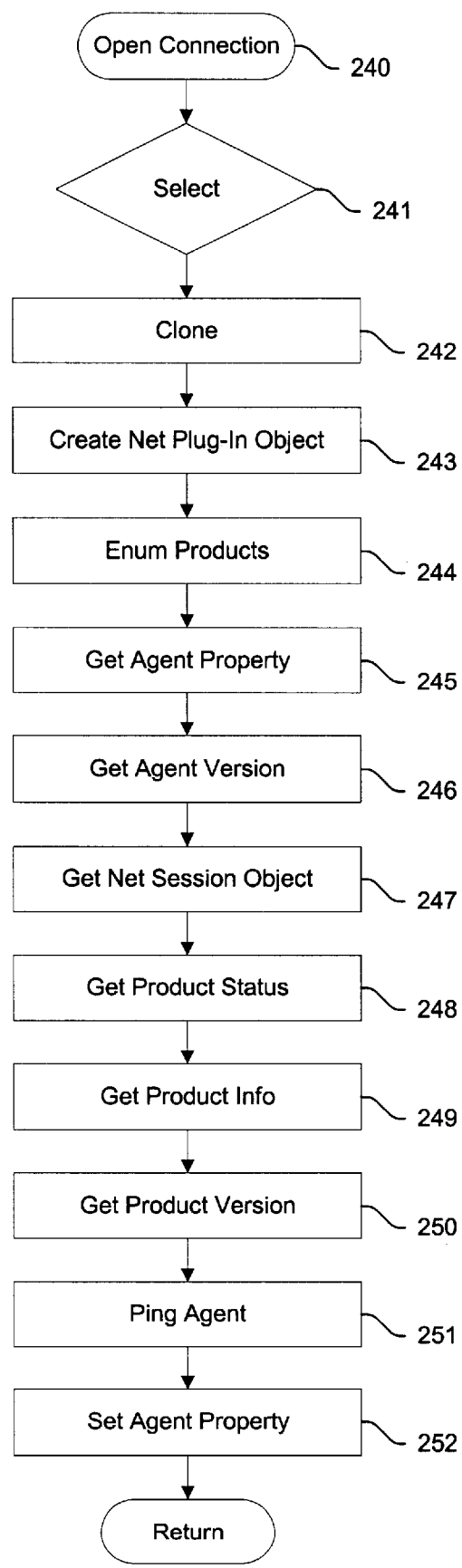
FIG. 9 is a flow diagram showing the routine for opening a connection for use in the process of FIG. 6.

FIG. 9 is a flow diagram showing the routine for opening a connection 240 for use in the process of FIG. 6. The purpose of this routine is to process a call on a method implemented in the connection interface, INetConnection, of the security management interface service 20. The appropriate method is selected (block 241) and executed to perform an operation as follows. Clone (block 242) creates a new network connection object based on the current network connection object. CreateNetPlugInObject (block 243) creates a new plug-in object belonging to the current connection. EnumProducts (block 244) enumerates all security applications installed on the remote computer and returns the Global Unique Identifier (GUID) of each. GetAgentProperty (block 245) returns the specified agent property. GetAgentVersion (block 246) returns the version of the agent on the remote client. GetNetSessionObject (block 247) returns a pointer to the interface of the parent session and adds a reference to the interface. GetProductStatus (block 248) returns the status of the specified plug-in component on the remote system. Get Productinfo (block 249) retrieves general information on the specified plug-in component. GetProductVersion (block 250) returns the version of the specified plug-in component on the remote system. PingAgent (block 251) checks whether the agent is running on the remote system. SetAgentProperty (block 252) sets the specified agent property.

Figure 10:
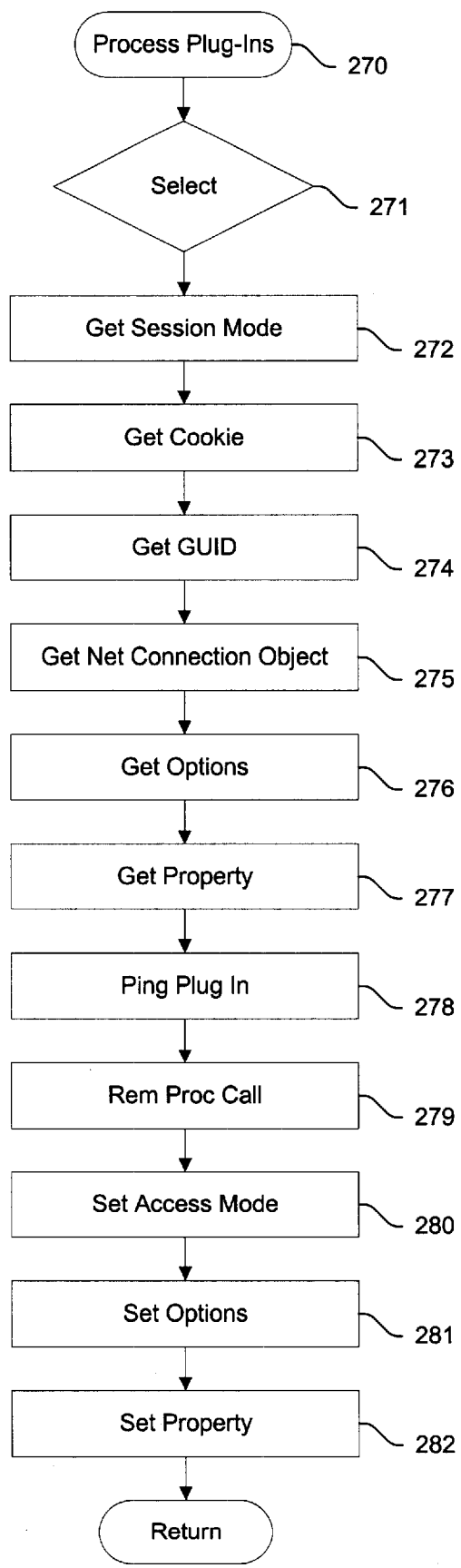
FIG. 10 is a flow diagram showing the routine for processing packet operations for use in the process of FIG. 6.

FIG. 10 is a flow diagram showing the routine for processing packet operations 270 for use in the process of FIG. 6. The purpose of this routine is to process a call on a method implemented in the connection interface, INetPlugIn, of the security management interface service 20. The appropriate method is selected (block 271) and executed to perform an operation as follows. GetSessionMode (block 272) retrieves the access mode describing the read/write privileges on the plug-in component for the calling snap-in component. GetCookie (block 273) returns the cookie identifier associated with the sink of the plug-in object. GetGUID (block 274) returns the product identifier of the plug-in component connected to the object. GetNetConnectionObject (block 275) returns a pointer to the interface of the parent connection and adds a reference to the interface. GetOptions (block 276) retrieves the connection-specific options for the current network plug-in object. GetProperty (block 277) returns the specified property. PingPlugIn (block 279) checks whether the corresponding plug-in component is alive on the remote system. RemProcCall (block 279) executes the specified remote procedure on the remote machine. SetAccessMode (block 280) sets the read/write privileges on the plug-in component for the calling snap-in component. SetOptions (block 281) sets connection-specific options for the current network plug-in object. SetProperty (block 282) sets the specified property.

Figure 11:
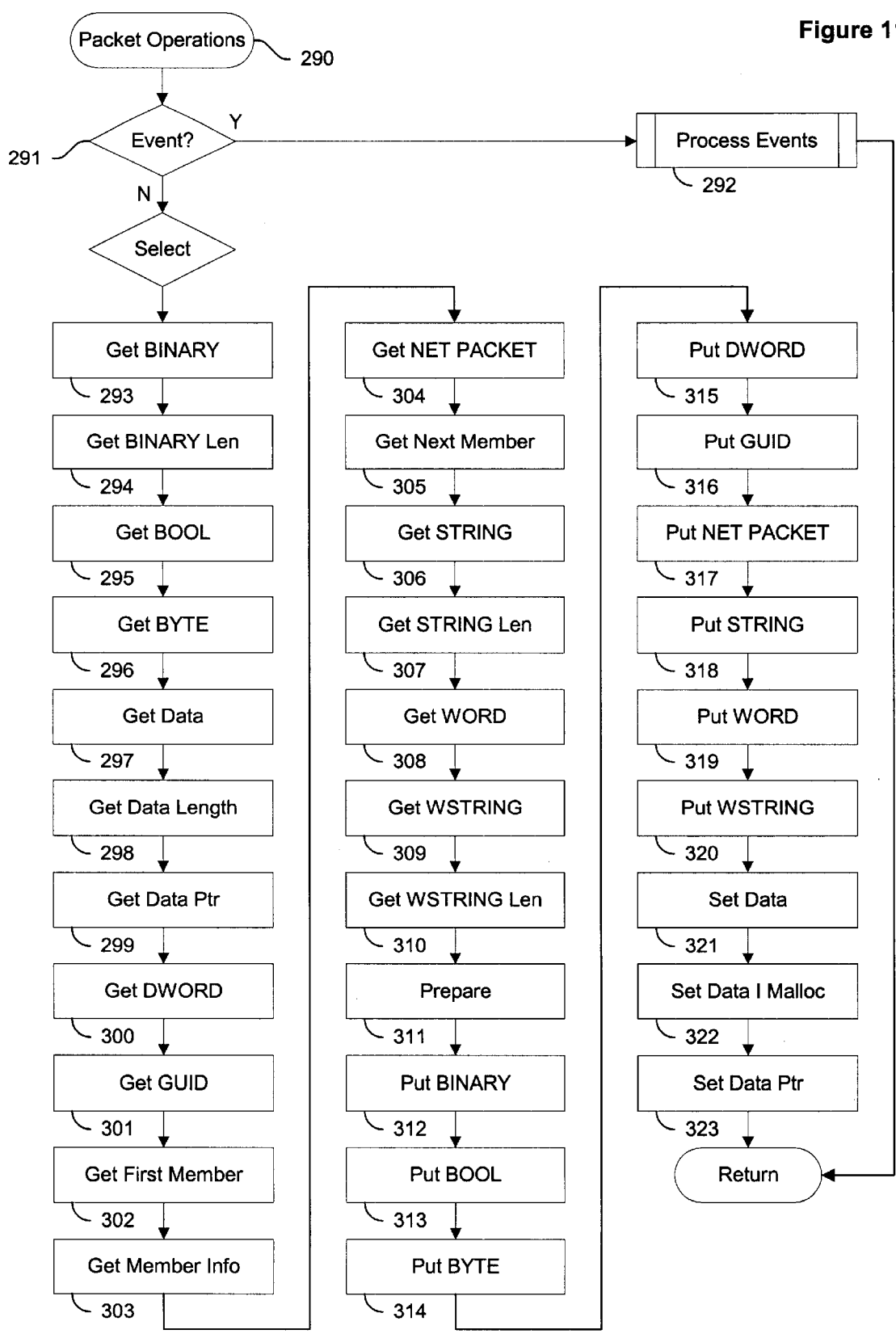
FIG. 11 is a flow diagram showing the routine for processing packet operations for use in the process of FIG. 6.

FIG. 11 is a flow diagram showing the routine for processing packet operations 290 for use in the process of FIG. 6. The purpose of this routine is to process a call on a method implemented in the connection interface, INetPacket, of the security management interface service 20. If an event requires processing (block 291), the routine for processing events is called (block 292), as further described below with reference to FIG. 12. Otherwise, the appropriate method is selected (block 291) and executed to perform an operation as follows. GetBINARY (block 293) retrieves a binary member. GetBINARYLen (block 294) retrieves the length of a BINARY member. GetBOOL (block 295) retrieves a Boolean member. GetBYTE (block 296) retrieves a byte member. GetData (block 297) retrieves the data for a network packet and stores the retrieved data into a specified buffer. GetDataLength (block 298) returns the number of bytes allocated for the network packet. GetDataPtr (block 299) returns a pointer to the beginning of the network packet. GetDWORD (block 300) retrieves a DWORD member. GetGUID (block 301) retrieves a GUID member. GetFirstMember (block 302) returns the first member of a network packet. GetMemberInfo (block 303) retrieves information on a specific member of a network packet. GetNETPACKET (block 304) retrieves a network packet object. GetNextMember (block 305) returns the next member of the network packet. GetSTRING (block 306) retrieves a STRING member. GetSTRINGLen (block 307) retrieves the length of a STRING member. GetWORD (block 308) retrieves a WORD member. GetWSTRING (block 309) retrieves a WSTRING member. GetWSTRINGLen (block 310) retrieves the length of a WSTRING member. Prepare (block 311) prepares the network packet for later use and initializes data structures. PutBINARY (block 312) adds or modifies a BINARY member. PutBOOL (block 313) adds or modifies a Boolean member. PutBYTE (block 314) adds or modifies a BYTE member. PutDWORD (block 315) adds or modifies a DWORD member. PutGUID (block 316) adds or modifies a GUID member. PutNETPACKET (block 317) adds a copy of the specified network packet to the object. PutSTRING (block 318) adds or modifies a STRING member. PutWORD (block 319) adds or modifies a WORD member. PutWSTRING (block 320) adds or modifies a WSTRING member. SetData (block 321) initializes a network packet with new data. SetDataIMalloc (block 322) initializes the network packet with new data and returns an address pointer to a block of memory reserved for the call. SetDataPtr (block 323) initializes a network packet with new data.

Figure 12:
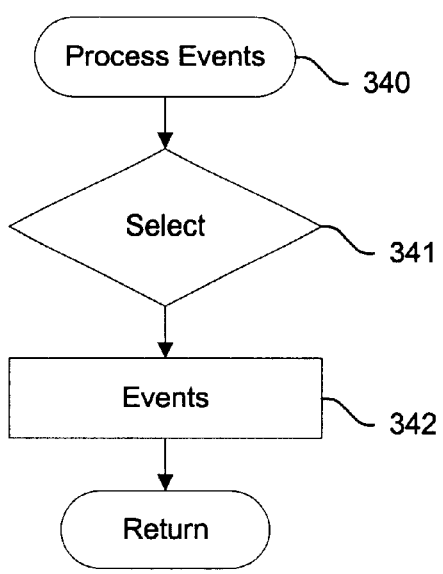
FIG. 12 is a flow diagram showing the routine for processing events for use in the routine of FIG. 11.

FIG. 12 is a flow diagram showing the routine for processing events 340 for use in the routine of FIG. 1. The purpose of this routine is to process a call on a method implemented in the connection interface, IPlugInEvents, of the security management interface service 20. The appropriate method is selected (block 341) and executed to perform an operation as follows. Events (block 342) signals a notification event from a specific plug-in component.

While the invention has been particularly shown and described as referenced to the embodiments thereof, those skilled in the art will understand that the foregoing and other changes in form and detail may be made therein without departing from the spirit and scope of the invention.

What is claimed is:

1. A system for maintaining a plurality of remote security applications using a centralized broker in a distributed computing environment, comprising:
   a centralized broker executing on a designated system within the distributed computing environment;
   a console interface exposed by the centralized broker, the console interface implementing a plurality of browser methods which each define a browser function which can be invoked by a plurality of snap-in components;
   a namespace snap-in component comprising a logical grouping identifying at least one remote security application being executed on a remote system within the distributed computing environment;
   a namespace interface exposed by the namespace snap-in component, the namespace interface implementing a plurality of namespace methods each defining a storage function which can be invoked by the centralized broker;
   a repository comprising a plurality of storages corresponding to each remote system and which each comprise a set of attributes describing each such remote security application defined within the namespace snap-in component;
   an agent executed on the remote system, the agent interfacing with the at least one remote security application;
   an agent communication service associated with the centralized broker as a snap-in component, the centralized broker and the at least one remote security application communicating packets that are exchanged directly between the agent and the agent communication service;
   a local security application interfaced with the centralized broker as a snap-in component, the local security application providing controls corresponding to the at least one remote security application;
   configuration settings from the local security application for the remote security application sent via the agent communication service; and
   results from the remote security application for the local security application sent via the agent.

2. A system according to claim 1, further comprising:
   an authenticated connection between the centralized broker and each such remote security application.

3. A system according to claim 2, wherein the authenticated connection comprises at least one of a DCOM-compliant interface, a WBEM-compliant interface, and a Sockets-based interface.

4. A system according to claim 2, further comprising:
   encrypted packets exchanged between the local security application and each such remote security application through the centralized broker over the authenticated connection.

5. A system according to claim 1, further comprising:
   the namespace snap-in component referencing the storage corresponding to a target remote system through the namespace snap-in component, retrieving the attributes for each remote security application installed on the target remote system from the storage and determining the remote security applications installed on the target remote system.

6. A system according to claim 5, further comprising:
   at least one remote security application stored in the repository; and
   the namespace snap-in component retrieving the at least one remote security application from the repository and installing the at least one remote security application on the target remote system.

7. A system according to claim 1, wherein the set of communication interfaces is COM-compliant.

8. A process for maintaining a plurality of remote security applications using a centralized broker in a distributed computing environment, comprising:

executing a centralized broker on a designated system within the distributed computing environment;

exposing a console interface from the centralized broker, the console interface implementing a plurality of browser methods which each define a browser function which can be invoked by a plurality of snap-in components;

defining a namespace snap-in component comprising a logical grouping identifying at least one remote security application being executed on a remote system within the distributed computing environment;

exposing a namespace interface from the namespace snap-in component, the namespace interface implementing a plurality of namespace methods each defining a storage function which can be invoked by the centralized broker;

forming a repository comprising a plurality of storages corresponding to each remote system and which each comprise a set of attributes describing each such remote security application defined within the namespace snap-in component;

executing an agent on the remote system, the agent interfacing with the at least one remote security application;

defining an agent communication service associated with the centralized broker as a snap-in component;

communicating packets between the centralized broker and the at least one remote security application with the packets being exchanged directly between the agent and the agent communication service;

interfacing a local security application with the centralized broker as a snap-in component, the local security application providing controls corresponding to the at least one remote security application;

sending configuration settings for the remote security application from the local security application via the agent communication service; and reporting results for the local security application from the remote security application via the agent.

9. A process according to claim 8, further comprising:

forming an authenticated connection between the centralized broker and each such remote security application.

10. A process according to claim 9, wherein the authenticated connection comprises at least one of a DCOM-compliant interface, a WBEM-compliant interface, and a Sockets-based interface.

11. A process according to claim 9, further comprising:

exchanging encrypted packets between the local security application and each such remote security application through the centralized broker over the authenticated connection.

12. A process according to claim 8, further comprising:

referencing the storage corresponding to a target remote system through the namespace snap-in component;

retrieving the attributes for each remote security application installed on the target remote system from the storage; and determining the remote security applications installed on the target remote system.

13. A process according to claim 12, further comprising:

storing at least one remote security application in the repository;

retrieving the at least one remote security application from the repository; and installing the at least one remote security application on the target remote system.

14. A process according to claim 8, wherein the set of communication interfaces is COM-compliant.

15. A computer-readable storage medium holding code for maintaining a plurality of remote security applications using a centralized broker in a distributed computing environment, comprising:

executing a centralized broker on a designated system within the distributed computing environment;

exposing a console interface from the centralized broker, the console interface implementing a plurality of browser methods which each define a browser function which can be invoked by a plurality of snap-in components;

defining a namespace snap-in component comprising a logical grouping identifying at least one remote security application being executed on a remote system within the distributed computing environment;

exposing a namespace interface from the namespace snap-in component, the namespace interface implementing a plurality of namespace methods each defining a storage function which can be invoked by the centralized broker;

forming a repository comprising a plurality of storages corresponding to each remote system and which each comprise a set of attributes describing each such remote security application defined within the namespace snap-in component;

executing an agent on the remote system, the agent interfacing with the at least one remote security application;

defining an agent communication service associated with the centralized broker as a snap-in component;

communicating packets between the centralized broker and the at least one remote security application with the packets being exchanged directly between the agent and the agent communication service;

interfacing a local security application with the centralized broker as a snap-in component, the local security application providing controls corresponding to the at least one remote security application;

sending configuration settings for the remote security application from the local security application via the agent communication service; and reporting results for the local security application from the remote security application via the agent.

16. A storage medium according to claim 15, further comprising:

forming an authenticated connection between the centralized broker and each such remote security application.

17. A storage medium according to claim 16, further comprising:

exchanging encrypted packets between the local security application and each such remote security application through the centralized broker over the authenticated connection.

18. A storage medium according to claim 15, further comprising:

referencing the storage corresponding to a target remote system through the namespace snap-in component;

retrieving the attributes for each remote security application installed on the target remote system from the storage; and determining the remote security applications installed on the target remote system.

19. A storage medium according to claim 18, further comprising:

storing at least one remote security application in the repository;

retrieving the at least one remote security application from the repository; and installing the at least one remote security application on the target remote system.

\* \* \* \* \*